Patented Aug. 11, 1931

1,818,942

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

ANTIOXIDANT OR AGE-RESISTER

No Drawing. Application filed August 2, 1928. Serial No. 297,115.

This invention relates to methods of treating rubber, transformer oils, soaps, or similar hydrocarbons, and it has particular relation to methods of preserving such materials.

One object of the invention is to provide a novel and highly efficient method of preserving rubber, which consists in adding thereto certain organic compounds that are found to materially decrease the rate of oxidation and decomposition of the rubber.

It has heretofore been observed that the hardening and loss of tensile strength which is characteristic of rubber goods upon aging is apparently due to the action of oxygen and light upon the rubber. It has been proposed to overcome these deleterious effects by incorporating into the rubber certain compounds which appear to absorb oxygen more readily than the rubber itself.

Such compounds as pyrogallol, hydroquinone and the reaction products of certain amines with aldehydes, have been proposed for this purpose. These compounds, while they have the power of materially reducing the rate of deterioration of rubber, are characterized by having little or no effect upon the rate of vulcanization of the rubber compounds into which they are introduced. Because of their power to absorb oxygen, these materials are commonly termed "antioxidants".

The compounds thus far suggested and tried for antioxidant powers have not been entirely satisfactory for various reasons. Some of them are too highly toxic in nature to permit their being handled without extreme precautions to prevent the workmen employed from being poisoned thereby. Other compounds are difficult to mill and distribute uniformly through a rubber mass, because they are of a tarry sticky nature. Still others act to a certain extent as accelerators of the rate of vulcanization. For that reason they cannot be incorporated into many of the standard rubber formulæ without materially upsetting the so-called "balance" of the compound, thus rendering necessary considerable experimentation in order to ascertain the correct proportions of the various ingredients required to obtain satisfactory results.

This invention consists in the discovery that certain aliphatic derivatives of naphthylamines are highly efficient preservatives of rubber, transformer oils, soaps and similar organic materials, and are characterized by being substantially free from most of the objectionable features heretofore encountered with antioxidants.

Naphthyl formamidines possess this property to an exceptional degree. An example of a compound of this class is di-α-naphthyl formamidine, which may be prepared by the following method:

Intermix equi-molecular proportions of α-naphthylamine and formic acid in a quantity of aniline sufficient readily to absorb all of the various ingredients. This mixture should be heated gently under a reflux condenser which is maintained at a temperature sufficiently high to permit the escape of any water vapor formed by the reaction, but which is still sufficiently low to cause the condensation of any aniline vapor which may be driven off from the reacting mass. This period of heating is continued for approximately four to six hours. At the end of that time, the temperature is raised sufficiently to drive off any volatile liquids which may be present. The residue is then dissolved in benzene and the solution thus formed is introduced into light petroleum or gasoline. The reaction product crystallizes out as an almost colorless material. If it is desired to obtain the material in a purer form, it is subjected to recrystallization from benzene or alcohol.

The reaction occurring during the process outlined may be represented by the following structural formula:

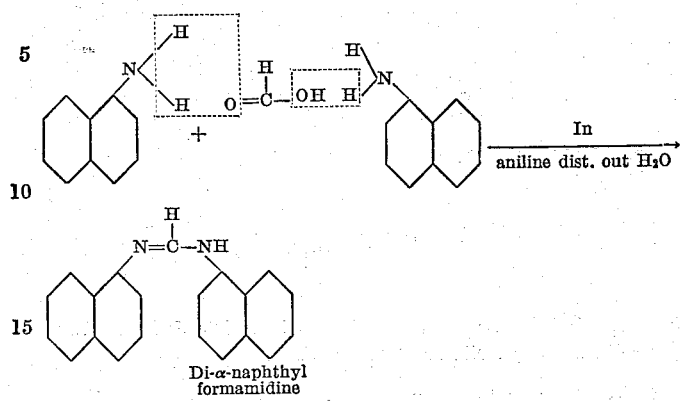

Di-α-naphthyl formamidine

The process outlined for the preparation of di-α-naphthyl formamidine may also be employed for the preparation of a reaction product of β-naphthyl amine, and formic acid, the reaction apparently being analogous to that described above. This compound is obtained as a brownish yellow powder having a melting point of 183° to 184° C.

The compounds just discussed may be incorporated into rubber with the greatest ease merely by milling the rubber and the compounds together upon an ordinary mill.

The new antioxidants may be employed in most of the standard rubber formulæ with excellent results. The following is an example of a formula which insures a highly satisfactory grade of product:

| | Parts |
|---|---|
| Extracted rubber | 100 |
| Zinc oxide | 5 |
| Sulphur | 3 |
| Stearic acid | 1.5 |
| Antioxidant | 1 |

In order to ascertain the efficiency of the preceding compounds as antioxidants, samples of rubber prepared in accordance with the preceding formula, and containing the new compounds, were subjected to vulcanization during varying periods of time. One set of samples thus obtained were subjected to physical tests in order to ascertain their elasticity and tensile strength before being subjected to aging. Another set of exactly similar samples was weighed to ascertain the original weight of each sample. Subsequently, they were placed in an ordinary oxygen bomb and subjected to an oxygen pressure of 150 pounds per square inch at a temperature of 50° C. for a period of six days. At the end of that time, the samples were removed from the bomb and were weighed to ascertain the percent increase of weight due to the absorption of oxygen. After the samples had been weighed they were subjected to tests exactly similar to those conducted upon the first set of samples. The results of these tests are contained in the following tables:

| Time of cure in mins. | Steam pressure lbs. per sq. inch | Load in kgs./cm.² at— | | | Percent elong. at break | Percent weight increase |
|---|---|---|---|---|---|---|
| | | 500% elong. | 700% elong. | Break | | |
| *Di-α-naphthyl formamidine* | | | | | | |
| ORIGINAL | | | | | | |
| 30 | 40 | 11 | 35 | 105 | 900 | -------- |
| 50 | 40 | 21 | 75 | 150 | 825 | -------- |
| 70 | 40 | 30 | 122 | 195 | 780 | -------- |
| AFTER AGING | | | | | | |
| 30 | 40 | 16 | 49 | 120 | 860 | .06 |
| 50 | 40 | 23 | 85 | 160 | 810 | .01 |
| 70 | 40 | 35 | 134 | 180 | 750 | .06 |
| *Formic acid derivative of β-naphthylamine* | | | | | | |
| ORIGINAL | | | | | | |
| 30 | 40 | 9 | 23 | 70 | 905 | -------- |
| 50 | 40 | 21 | 66 | 150 | 850 | -------- |
| 70 | 40 | 24 | 78 | 160 | 830 | -------- |
| AFTER AGING | | | | | | |
| 30 | 40 | 11 | 30 | 85 | 885 | .01 |
| 50 | 40 | 24 | 84 | 140 | 790 | .13 |
| 70 | 40 | 29 | 97 | 140 | 765 | .40 |

It will be observed that by incorporating any of the preceding compounds in the rubber, a product having an exceptionally high degree of resistance to the action of oxygen is obtained, even when the product is exposed to the relatively severe conditions existing during the period of artificial aging. Samples of rubber prepared in accordance with the preceding formula, but which contain no antioxidant, upon being subjected to the same conditions, were reduced to resinous masses possessing little or no tensile strength or elasticity and useless for all practical purposes.

The basic materials required for the preparation of the antioxidants discussed are standard compounds which are always obtainable in markets dealing in this type of product. The reactions required to transform these basic materials into the antioxidants are relatively simple and may be effected with great ease with extremely simple equipment.

Although I have described in detail only the preferred forms which the invention may assume, it will be apparent to those skilled in the art that it is not so limited, but that various minor modifications may be made therein without departing from the spirit of the invention or from the scope of the appended claims.

What I claim is:

1. A method of preserving a vulcanizable rubber compound which comprises subjecting it to vulcanization in the presence of dinapthyl formamidine.

2. A method of preserving a vulcanizable rubber compound which comprises subjecting it to vulcanization in the presence of a reaction product of $\beta$-naphthylamine and formic acid.

3. A method of preserving a vulcanizable rubber compound which comprises subjecting it to vulcanization in the presence of a reaction product of naphthylamine and formic acid, said reaction product being formed in the presence of a neutral solvent.

4. A method of preserving a vulcanizable rubber compound which comprises subjecting it to vulcanization in the presence of a reaction product of $\beta$-naphthylamine and formic acid, said reaction product being formed in the presence of aniline.

5. A rubber product that has been vulcanized in the presence of a material selected from a group consisting of di-$\alpha$-naphthyl formamidine and di-$\beta$-naphthyl formamidine.

6. A rubber product that has been vulcanized in the presence of di-$\beta$-napthyl formamidine.

7. A rubber product that has been vulcanized in the presence of a reaction product of naphthylamine and formic acid, said reaction product having been formed in the presence of a solvent.

8. A rubber product that has been vulcanized in the presence of a reaction product of napthylamine and formic acid, said reaction product having been formed in the presence of aniline.

In witness whereof, I have hereunto signed my name.

Signed at Akron, in the county of Summit and State of Ohio, U. S. A., this 31st day of July, 1928.

ALBERT M. CLIFFORD.